US005600456A

United States Patent [19]
Maruyama et al.

[11] Patent Number: 5,600,456
[45] Date of Patent: Feb. 4, 1997

[54] TRANSMISSION LIQUID CRYSTAL DISPLAY WITH A REDUCED DEPENDENCY OF A DISPLAY QUALITY UPON A VISUAL ANGLE

[75] Inventors: Muneo Maruyama; Koji Kashimoto, both of Tokyo, Japan

[73] Assignee: NEC Corporation, Tokyo, Japan

[21] Appl. No.: 522,930

[22] Filed: Sep. 1, 1995

[30] Foreign Application Priority Data

Sep. 1, 1994 [JP] Japan .................................. 6-232288

[51] Int. Cl.⁶ ................................................ G02F 1/1335
[52] U.S. Cl. ............................... 349/64; 349/66; 349/95; 349/112
[58] Field of Search ................................. 359/40, 41, 69, 359/49

[56] References Cited

U.S. PATENT DOCUMENTS

| 5,151,801 | 9/1992 | Hiroshima .................................. 359/41 |
| 5,161,041 | 11/1992 | Abileah et al. ........................... 359/49 |

FOREIGN PATENT DOCUMENTS

| 58-169130 | 10/1983 | Japan ..................................... 359/49 |
| 60-262131 | 12/1985 | Japan . |
| 62-56930 | 3/1987 | Japan . |
| 64-51913 | 3/1989 | Japan . |
| 5-249453 | 9/1993 | Japan ..................................... 359/40 |
| 6-138454 | 5/1994 | Japan ..................................... 359/40 |

*Primary Examiner*—William L. Sikes
*Assistant Examiner*—Ron Trice
*Attorney, Agent, or Firm*—Young & Thompson

[57] ABSTRACT

A transmission liquid crystal display comprises a liquid crystal panel including at least two substrates spaced apart from one another through spacers to confine a liquid crystal between the two substrates; a surface light source provided at a first side of the liquid crystal panel; and an optical diffusion lens having a plate-like shape provided at a second side of the liquid crystal panel, the lens having first and second surfaces, the first surface facing to a display screen and the second surface facing to a liquid crystal panel, entire parts of the first surface is flat, and the second surface comprises alternating flat portions and convex or concave portions having a predetermined curvature, the convex or concave portions having a difference in level of a top portion thereof from the flat portions, the convex or concave portions being arranged at a predetermined pitch, wherein a ratio of the difference in level to the pitch is in the range from 2.9:10 to 0.8:10.

24 Claims, 4 Drawing Sheets

5,600,456

TRANSMISSION LIQUID CRYSTAL DISPLAY WITH A REDUCED DEPENDENCY OF A DISPLAY QUALITY UPON A VISUAL ANGLE

BACKGROUND OF THE INVENTION

1. Field of the Invention

The invention relates to a transmission liquid crystal display with a reduced dependency of a display quality upon a visual angle.

2. Description of the Related Art

FIG. 1 is a fragmentary cross sectional elevation view illustrative of a conventional transmission liquid crystal display. The conventional transmission liquid crystal display has a surface light source 201 and a liquid crystal panel 211. The surface light source 201 may comprise either a cold cathode fluorescent lamp optoguiding plate. The liquid crystal panel 211 includes a deflection plate 202, an active matrix substrate 203 laminated on the deflection plate 202, a color filter substrate 205 provided to be spaced apart from the active matrix substrate 203 through sealing resin agents 206 to define, between both the active matrix and color filter substrates 203 and 205, a space filled with a liquid crystal 204 with a twist angle of 90 degrees. The active matrix substrate comprises a transparent glass substrate on which a number of sets of thin film transistors and transparent pixel electrodes are aligned in matrix. The color filter substrate 205 comprises a transparent common electrode and a color filter. The sealing resin agents 206 provides both functions of an adhesion between the active matrix and color filter substrates 203 and 205 and a sealing for the liquid crystal between those substrates 203 and 205. There is further provided on the color filter substrate 205 a deflection plate 207 with a deflection axis deflected by 90 degrees, in the normally white mode, from a deflection axis of the deflection plate 202.

In the above liquid crystal display, the common electrode on the color filter substrate 205 is applied with a predetermined fixed voltage, while the transparent pixel electrodes of the active matrix substrate 203 are applied with variable voltages according to image data to be displayed. As a result, a magnitude of the twist of the liquid crystal 204 between the above two substrates 203 and 205 is changed thereby a brightness of the display light emitting from the pixel electrodes is modulated.

The liquid crystal employed in such liquid crystal display possesses a refraction index anisotropy which causes, in a large visual angle, an inversion of gray scales and a reduction in a ratio of contrast, resulting in a considerable deterioration of display quality. In the above liquid crystal display, concretely, the visual angle which, beyonds 10 degrees downward, causes the gray scale inversion and the visual angles which, beyond 20 degrees upward and 50 degrees downward, cause a ratio of the contrast to be reduced down to 10 or less.

The above transmission liquid crystal display illustrated in FIG. 1 has a disadvantage in a narrow visual angle. A large deflection from the normal line of the liquid crystal panel results in a large difference in a retardation of the transmitted lights thereby the graduation property or the gray scale property is deteriorated. This results in a lowering of the ratio of contrast and thus resulting in a difficulty in obtaining a wide visual angle image.

To settle the above problems, there have been proposed some techniques to reduce the dependency of the display quality upon the visual angle of the transmission liquid crystal display. FIG. 2 is a cross sectional elevation view illustrative of another conventional transmission liquid crystal display with an improved dependency of the display quality upon the visual angle. The conventional transmission liquid crystal display has a surface light source not illustrated, a liquid crystal panel 311, a collimator 314 and a plurality of micro-lenses 308. The surface light source may comprise either a cold cathode fluorescent lamp or an optoguiding plate. The liquid crystal panel 311 includes a deflection plate 302, a scanning electrode substrate 203 laminated on the deflection plate 302, a scanning electrode 303a provided on the scanning electrode substrate 303, a signal electrode substrate 305 with a plurality of signal electrodes, which is provided to be spaced apart from the signal electrode substrate 303 through sealing resin agents 306 to define, between both the scanning electrode and signal electrode substrates 303 and 305, a space filled with a liquid crystal 304. The sealing resin agents 306 provides both functions of an adhesion between the scanning electrode and signal electrode substrates 303 and 305 and a sealing for the liquid crystal between those substrates 303 and 305. There is further provided on the signal electrode substrate 305 a deflection plate 207. On the deflection plate 307, there is provided the collimator 314 which allows a transmission only of a vertical-to-display surface component of the light. For every pixel of the display panel, the micro-lenses 308 are provided on the collimator 314.

The provision of the collimator 314 permits the transmission of the vertical-to-surface component of the light transmitted through the liquid crystal panel 211. If no micro-lens were provided, the vertical-to-surface component results in the best display property but a too narrow visible angle to perform the display die to a strong directivity. Accordingly, the above display is provided with the micro-lenses 308 in front of the collimator 314 to cause an optical diffusion for widening the visual angle.

The above display faces to a problem with a difficulty in a high accuracy alignment of the micro-lenses on the corresponding pixels of the liquid crystal panel. A further disadvantage of the above display is a difference in thermal expansion between a glass material for the glass substrate constituting the liquid crystal panel 311 and the micro-lenses 308 causes a variation of temperature to generate a dislocation between the liquid crystal panel 311 and the micro-lenses 308. The dislocation between them causes a deterioration in quality of the display. Further, the micro-lenses are positioned at a direct viewing position. The micro-lenses are transparent to the light, but have no mirror face, and thereby a diffused reflection is caused to look whitish in color. Further there is caused a reflection of the external light thereby resulting in a deterioration in a visual sense of light.

To settle the above problem, it has been proposed to provide still another transmission liquid crystal display with more fine micro-lenses, the number of which is larger than the number of the pixels. FIG. 3 is a cross sectional elevation view illustrative of this transmission liquid crystal display device. The conventional transmission liquid crystal display has a surface light source 401 and a liquid crystal panel 411. The surface light source 401 may comprise either a cold cathode fluorescent lamp or an optoguiding plate. The liquid crystal panel 411 includes a deflection plate 402, an active matrix substrate 403 laminated on the deflection plate 402, a color filter substrate 405 be spaced apart from the active matrix substrate 403 through sealing resin agents 406 to define, between both the active matrix and color filter substrates 403 and 405, a space filled with a liquid crystal 404 with a twist angle of 90 degrees. The active matrix substrate comprises a transparent glass substrate on which a number of sets of thin film transistors and transparent pixel electrodes are aligned in matrix. The color filter substrate 405 comprises a transparent common electrode and a color filter. The sealing resin agents 406 provides both functions of an adhesion between the active matrix and color filter substrates 403 and 405 and a sealing for the liquid crystal between those substrates 403 and 405. There is further provided on the color filter substrate 405 a deflection plate 407 with a deflection axis deflected by 90 degrees, in the normally white mode, from a deflection axis of the deflection plate 402. Moreover there is provided an optical diffusion lens in front of the liquid crystal panel 411.

In the above transmission liquid crystal display, light is emitted from the surface light source 401 and then transmitted through the liquid crystal panel 411 into the optical diffusion lens 408. A front light showing the best graduation or gray scale is diffused to have upward and downward visual angles, while upward and downward regions visual fields of the display region generate a light with a broken graduation or the gray scale which is then also diffused by the optical diffusion lens 408, resulting in a relaxation of the graduation inversion or the gray scale inversion and accordingly the visual angle is widened.

The above transmission liquid crystal display of FIG. 3 has the following disadvantages. The optical diffusion lens is positioned at a direct viewing position. Although the optical diffusion lens is transparent to the light but have no mirror face thereby a diffused reflection is caused to look into a whitish color. Further there is caused a reflection of the external light thereby resulting in a deterioration in a visual sense of light. The distance between the liquid crystal panel and the optical diffusion lens is large thereby causing a display blur. Namely, the display blur is caused due to the following two factors. The first factor is a scattering at a lens surface and a reflection of the light for a focus of the light. The second factor is a spread of the emission light at a predetermined angle. The width of the light beam with the spread is increased as the above distance becomes large. FIG. 4 is illustrative of the light beam spread. The light having a spread angle emits from the color filter 405 and then be transmitted with showing a spread through the transparent glass substrate 405a and the deflection plate 407. Although the light with a width "a" at the color filter 405 should ideally be observed, the light is actually spread to a width "a'" together with a scattering and a refraction just before observation. This is the cause of the display blur. The magnitude of the spread or the blur is proportional to a distance between the color filter 405 and the optical diffusion lens 408.

There has been yet another proposal for a combination of the liquid crystal panel with optical elements such as optical lenses for improvement in the display quality. The Japanese Utility Model Application No. 62-147947 discloses a transmission liquid crystal display provided with a linear Fresnel lens for optical condense within the visual angle in front of a liquid crystal panel. The Japanese Laid-open Patent Application No. 60-262131 discloses another transmission liquid crystal display wherein lenticular lenses or compound eyes-lenses are provided at both a light source side and a display side of the liquid crystal panel so as to correspond 14 focus both the lenticular and the compound eyes lenses at the liquid crystal side.

There had been proposed in the prior art no ideal transmission liquid crystal display free from any problems and any disadvantages as described above. It has therefore been required to develop a quite novel transmission liquid crystal display free from any problems and any disadvantages as described above.

SUMMARY OF THE INVENTION

Accordingly, it is an object of the present invention to provide a novel transmission liquid crystal display free from any problems as described above.

It is a further object of the present invention to provide a novel transmission liquid crystal display with a reduced dependency of a display quality upon a visual angle.

It is a further object of the present invention to provide a novel transmission liquid crystal display free from any display blur.

It is a further object of the present invention to provide a novel transmission liquid crystal display which is capable of suppression of a reflection of an external light to allow the display to be free from the whitening of the display.

It is a still further object of the present invention to provide a novel transmission liquid crystal display which shows an excellent display quality.

It is a still further object of the present invention to provide a novel transmission liquid crystal display with an excellent graduation or gray scale properties.

It is yet a further object of the present invention to provide a novel transmission liquid crystal display with a display screen at a high contrast ratio.

The above and other objects, features and advantages of the present invention will be apparent from the following descriptions.

The invention provides a transmission liquid crystal display which comprises a liquid crystal panel including at least two substrates spaced apart from one another through spacers to confine a liquid crystal between the two substrates, a surface light source provided at a first side of the liquid crystal panel, and an optical diffusion lens having a plate-like shape provided at a second side of the liquid crystal panel. The lens has first and second surfaces. The first surface faces to a display screen and the second surface facing to a liquid crystal panel. Entire parts of the first surface are flat and the second surface comprises alternating flat portions and convex or concave portions having a predetermined curvature. The convex or concave portions has a difference in level of a top or a bottom thereof from the flat portions. The convex or concave portions are arranged at a predetermined pitch. A ratio of the difference in level to the pitch is in the range from 2.9:10 to 0.8:10.

BRIEF DESCRIPTIONS OF THE DRAWINGS

Preferred embodiments of the present invention will be described in detail with reference to the accompanying drawings.

DESCRIPTIONS OF THE INVENTION

Figure 1:
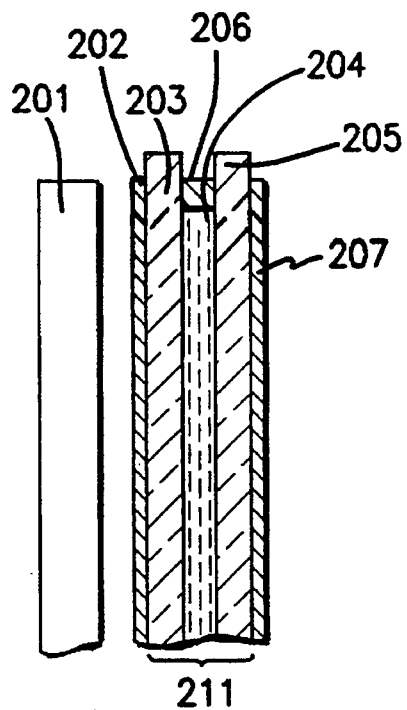
FIG. 1 is a fragmentary cross sectional elevation view illustrative of the conventional transmission liquid crystal display.
Figure 3:
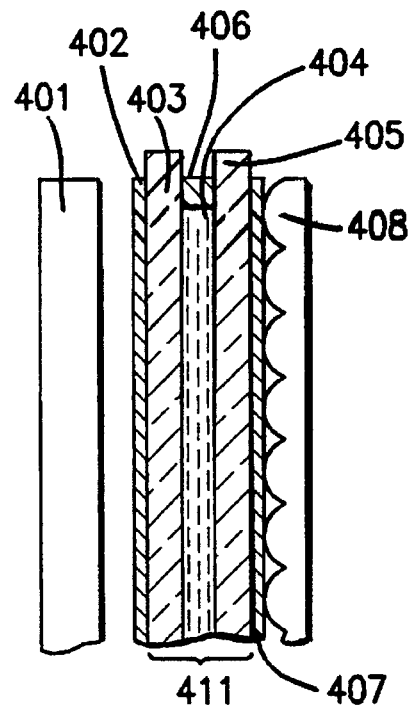
FIG. 3 is a fragmentary cross sectional elevation view illustrative of still another conventional transmission liquid crystal display.
Figure 2:
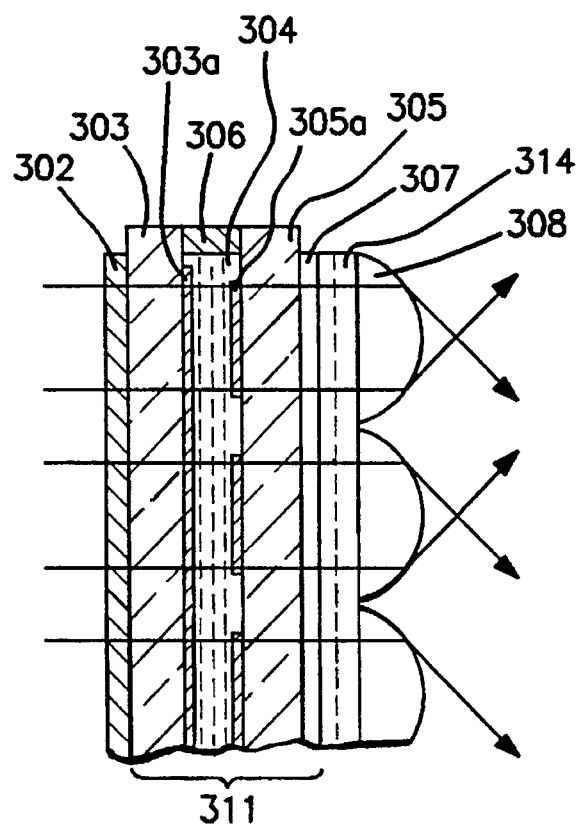
FIG. 2 is a fragmentary cross sectional elevation view illustrative of another conventional transmission liquid crystal display.
Figure 4:
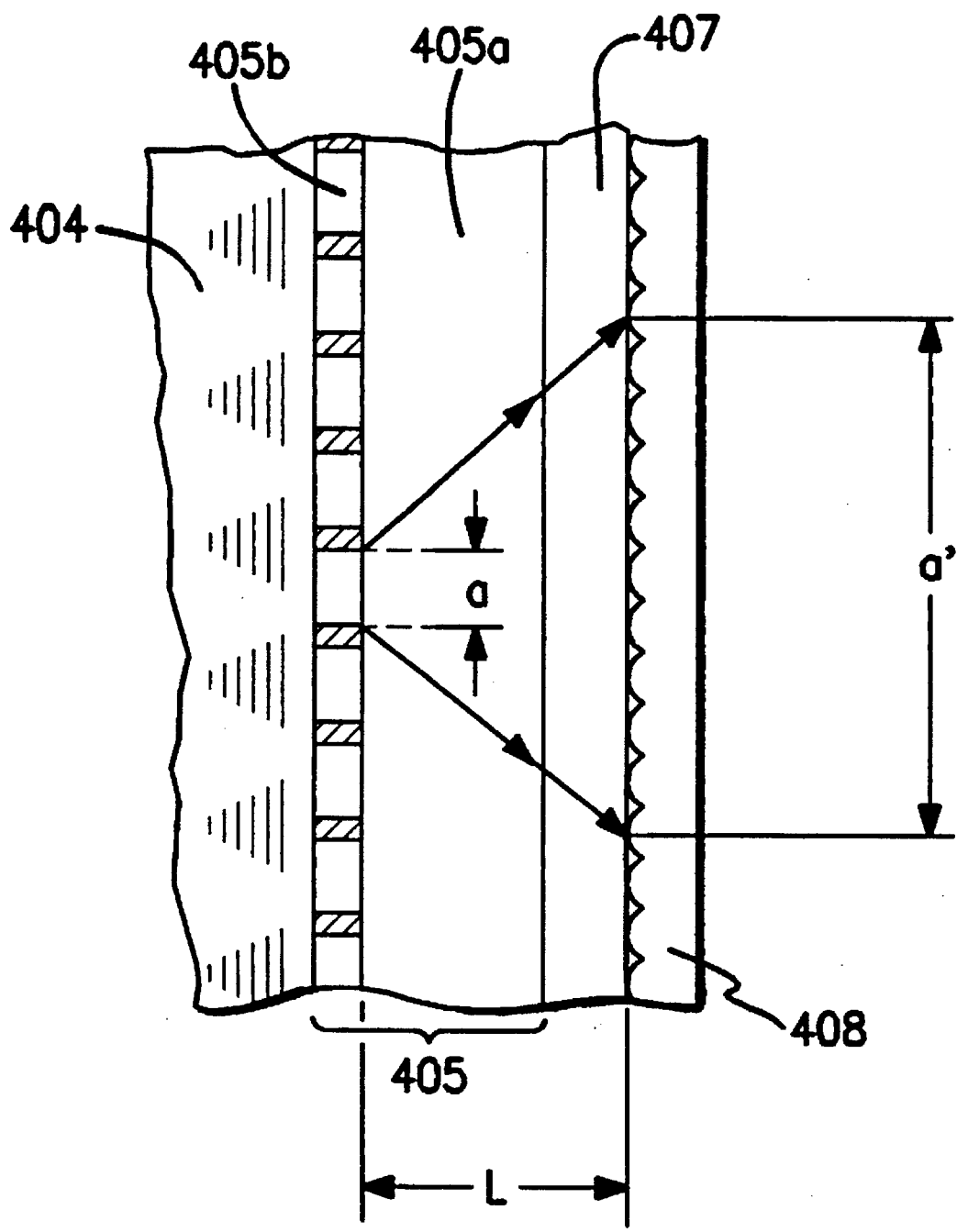
FIG. 4 is a fragmentary cross sectional elevation view illustrative of the unnecessary light spread of the conventional transmission liquid crystal display of FIG. 3.

The present invention provides an optical diffusion lens having a plate-like shape to be employed in a transmission liquid crystal display. The lens has first and second surfaces wherein the first surface faces to a display screen and the second surface faces to a liquid crystal panel. Entire parts of the first surface are flat. The second surface comprises alternating flat portions and convex portions having a predetermined curvature. The convex portions have a difference in level of a top portion thereof from the flat portions. The convex portions are arranged at a predetermined pitch so that a ratio of the difference in level to the pitch is in the range from 2.9:10 to 0.8:10.

The present invention also provides an optical diffusion lens having a plate-like shape to be employed in a transmission liquid crystal display. The lens has first and second surfaces, wherein the first surface faces to a display screen and the second surface faces to a liquid crystal panel. Entire parts of the first surface are flat. The second surface comprises alternating flat portions and concave portions having a predetermined curvature. The concave portions have a difference in level of a bottom portion thereof from the flat portions. The concave portions are arranged at a predetermined pitch so that a ratio of the difference in level to the pitch is in the range from 2.9:10 to 0.8:10.

It may be available that the convex or concave portion has a semi-cylindrical shape.

It is preferable that the first surface is covered by a deflection plate.

It is preferable that the second surface is fixed on the liquid crystal panel by a transparent adhesive agent.

It is preferable that the ratio is in the range from 1.8:10 to 1.2:10.

The present invention also provides a transmission liquid crystal display comprising a liquid crystal panel including at least two substrates spaced apart from one another through spacers to confine a liquid crystal between the two substrate, a surface light source provided at a first side of the liquid crystal panel, and an optical diffusion lens having a plate-like shape provided at a second side of the liquid crystal panel. The optical diffusion lens has first and second surfaces, wherein the first surface faces to a display screen and the second surface facing to a liquid crystal panel. Entire parts of the first surface are flat. The second surface comprises alternating flat portions and convex portions having a predetermined curvature. The convex portions have a difference in level of a top portion thereof from the flat portions. The convex portions are arranged at a predetermined pitch so that a ratio of the difference in level to the pitch is in the range from 2.9:10 to 0.8:10.

The present invention also provides a transmission liquid crystal display comprising a liquid crystal panel including at least two substrates spaced apart from one another through spacers to confine a liquid crystal between the two substrate, a surface light source provided at a first side of the liquid crystal panel, and an optical diffusion lens having a plate-like shape provided at a second side of the liquid crystal panel. The optical diffusion lens has first and second surfaces, wherein the first surface faces to a display screen and the second surface facing to a liquid crystal panel. Entire parts of the first surface are flat. The second surface comprises alternating flat portions and concave portions having a predetermined curvature. The concave portions have a difference in level of a bottom portion thereof from the flat portions. The concave portions are arranged at a predetermined pitch so that a ratio of the difference in level to the pitch is in the range from 2.9:10 to 0.8:10.

It is preferable that a convex or concave portion has a semi-cylindrical shape.

It is preferable that the second surface is fixed on the liquid crystal panel by a transparent adhesive agent.

It is preferable that the ratio is in the range from 1.8:10 to 1.2:10.

It may be available to further include a first polarizing plate provided on the first surface of the optical diffusion lens.

It may be available to further include a second polarizing plate provided at the first side on the liquid crystal panel, wherein the second deflection plate has a polarizing axis different by 90 degrees from a polarizing axis of the first deflection plate.

It may be available to further include a prism lens film provided between the surface light source and the liquid crystal panel.

It may be available to further include a louver provided between the prism lens and the liquid crystal panel.

It may be available that two substrates comprise an active matrix substrate and a color filter substrate. The active matrix substrate is provided at the first side of the liquid crystal panel. The active matrix substrate is provided with a plurality of transparent pixel electrodes in matrix thereon. The color filter substrate provided at the second side of the liquid crystal panel. The color filter substrate is formed with a color filter and a common electrode thereon.

Figure 5:
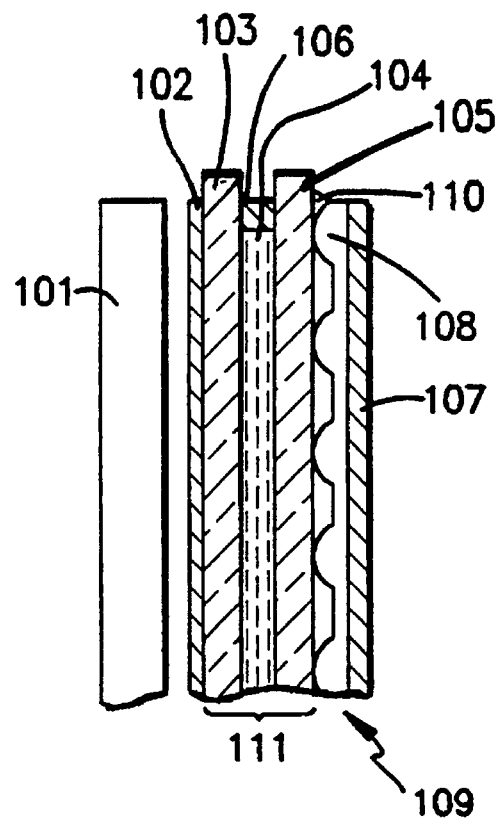
FIG. 5 is a fragmentary cross sectional elevation view illustrative of a novel transmission liquid crystal display in a first embodiment according to the present invention.

A first embodiment according to the present invention will be described with reference to FIG. 5 which is illustrative of a structure of a novel transmission liquid crystal display. The novel transmission liquid crystal display comprises a surface light source 101, a liquid crystal panel 111 with a first side which faces to the surface light source 101 and an optical control plate 109 adhered on the liquid crystal panel at a second side thereof. The surface light source 101 may comprise either a cold cathode fluorescent lamp or an optical guiding plate. The liquid crystal panel 111 comprises an active matrix substrate 103 and a color filter substrate 105 which are spaced apart from each other through a spacer 106 which comprises a sealing resin agent. The sealing resin agent has three different functions. The first function is a sealing function. The second is a spacer function to ensure a fixed space between the active matrix substrate 103 and the color filter substrate 105. The third function is an adhesive agent for adhesion between the active matrix substrate 103 and the color filter substrate 105. The active matrix substrate 103 comprises a transparent glass substrate on which a number of sets of thin film transistors and transparent pixel electrodes are formed in matrix. The color filter substrate 105 is formed with a color filter and a transparent common electrode. A space defined between the active matrix substrate 103 and the color filter substrate 105 is filled with a liquid crystal 104 such as a twisted nematic liquid crystal. An outside surface of the active matrix substrate 103 is formed with a first polarizing plate 102 which faces to and is spaced part from the surface light source 101. The optical control plate 109 is adhered on an outside of the color filter substrate 105 by a transparent adhesive agent 110.

The optical control panel 109 comprises an optical diffusion lens 108 and a second polarizing plate 107. The optical diffusion lens 108 has a plate-like shape. The optical diffusion lens 108 has a first surface in contact with the second polarizing plate 107 and a second surface adhered through the transparent adhesive agent 110 on the outside surface of the color filter substrate 105. Entire parts of the first surface, in contact with the second polarizing plate 107, of the optical diffusion lens 108 are flat.

Figure 6A:
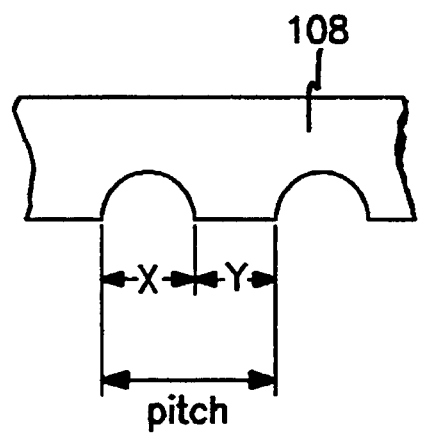
FIGS. 6A and 6B are fragmentary cross sectional elevation views illustrative of different shapes of an optical diffusion lens employed in a novel transmission liquid crystal display in a first embodiment according to the present invention.

As illustrated in FIG. 6A, the second surface of the optical diffusion lens 108 comprises alternating flat portions "Y" and concave portions "X" having a predetermined curvature. The concave portions formed on the second surface of the optical diffusion lens 108 have a difference in level of a bottom portion thereof from the flat portions of the optical diffusion lens 108. The concave portions are arranged at a predetermined pitch so that a ratio of the difference in level to the pitch is in the range from 2.9:10 to 0.8:10. The pitch is concretely in the range from 30 to 360 micrometers. This pitch should be determined to suppress any generation of moire on a screen image not illustrated but determined independently from a pitch between pixels of the display. The concave portions of the optical diffusion lens have a semi-cylindrical shape with a ridge directed toward a horizontal direction of the display screen for compensation for a diffusion property having a large dependency upon a visual angle in a vertical direction. The diffusion property of the diffusion lens 108 has a larger dependency upon a visual angle in the vertical direction rather than a dependency upon a visual angle in the horizontal direction. The flat portions are preferably processed to have mirror planes to reduce a scattering of light at the surface of the optical diffusion lens 108 as well as to prevent an unnecessary refraction of the light, although the concave portions are preferably processed to have the mirror face. Such processes optical diffusion lens is capable of suppressing any display blur. The flat portions of the optical diffusion lens reduces the diffusion of the light. An increase in curvature of the concave portions can enhance the diffusion of the light. Accordingly, the decrease of the optical diffusion by the flat portions of the optical diffusion lens 108 can be compensated by the increase in the curvature of the concave portions thereof. Hence, the optical diffusion property of the optical diffusion lens 108 depends upon both a ratio in width of the concave portions "X" to the flat portions "Y" and the curvature of the concave portions "X".

It is more preferable that the ratio of the above difference in level to the above pitch is in the range from 1.8:10 to 1.2:10.

Figure 6B:
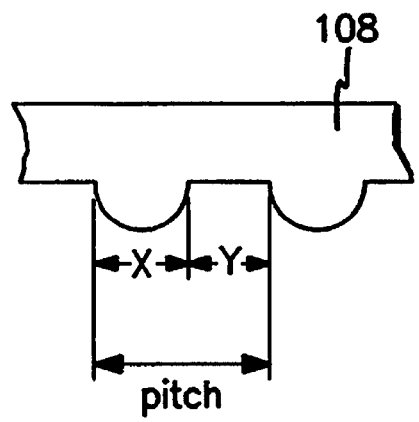

Alternatively, as illustrated in FIG. 6B, the second surface of the optical diffusion lens 108 comprises alternating flat portions "Y" and convex portions "X" having a predetermined curvature. The convex portions formed on the second surface of the optical diffusion lens 108 have a difference in level of a bottom portion thereof from the flat portions of the optical diffusion lens 108. The convex portions are arranged at a predetermined pitch so that a ratio of the difference in level to the pitch is in the range from 2.9:10 to 0.8:10. The pitch is concretely in the range from 30 to 360 micrometers. This pitch should be determined to suppress any generation of moire on a screen image not illustrated but determined independently from a pitch between pixels of the display. The convex portions of the optical diffusion lens have a semi-cylindrical shape with a ridge directed toward a horizontal direction of the display screen for compensation for a diffusion property having a large dependency upon a visual angle in a vertical direction. The diffusion property of the diffusion lens 108 has a larger dependency upon a visual angle in the vertical direction rather than a dependency upon a visual angle in the horizontal direction.

The flat portions are preferably processed to have mirror planes to reduce a scattering of light at the surface of the optical diffusion lens 108 as well as to prevent an unnecessary refraction of the light, although the convex portions are preferably processed to have the mirror face. Such processes optical diffusion lens is capable of suppressing any display blur. The flat portions of the optical diffusion lens reduces the diffusion of the light. An increase in curvature of the convex portions can enhance the diffusion of the light. Accordingly, the decrease in the optical diffusion by the flat portions of the optical diffusion lens 108 can be compensated by the increase in the curvature of the convex portions thereof. Hence, the optical diffusion property of the optical diffusion lens 108 depends upon both a ratio in width of the convex portions "X" to the flat portions "Y" and the curvature of the convex portions "X".

It is more preferable that the ratio of the above difference in level to the above pitch be in the range from 1.8:10 to 1.2:10.

The first surface of the optical diffusion lens 108 is covered by the second polarizing plate 107 for controlling a tonality of gray scale thereby resulting in a suppression of a reflection of an external light at a front surface of the display panel within a halt thereof. As a result, the image displayed on the screen has a high quality and is free from the problem of whitening.

The provision of the flat portions between the convex or concave portions reduces the scattering of the light refraction toward the viewpoint. A short distance between the liquid crystal panel 111 and the optical diffusion lens 108 may contribute to suppress the display blur.

The optical diffusion lens 108 may, for example, be formed as follows. On the second polarizing plate 107, a denatured acrylate resin having a good transparency, typically hydroxyalkylmethacrylate or alkylmethacrylate, is applied for a mold pressing process and subsequent exposure of the resin to a ultraviolet ray, to thereby render the transparent resin. The reason for the solidification of the resin by the exposure to the ultraviolet ray is to render the lens free of any birefracting property. Assuming that the optical diffusion lens had the undesirable birefracting property, the light being transmitting through such optical diffusion lens is subjected to a change in the deflecting state thereof. As a result, the light deflected by the second polarizing plate 107 is different from the light to be displayed on the screen. This may cause a reduction of the ratio of contrast of the image displayed on the display screen. However, according to the present invention, as described above, the solidification of the transparent resin to form the optical diffusion lens is achieved by irradiation of the ultraviolet ray thereonto with application of no pressure nor tension to thereby form the optical diffusion lens having an optical isotropy. The used mold is removed after the solidification of the transparent resin is complete. As a result, the optical diffusion lens 108 having the convex or concave portions of the is formed on the second polarizing plate 107.

The adhesion of the optical diffusion lens 108 onto the liquid crystal panel 111 may, for example, be carried out as follows. On the color filter substrate 105 of the liquid crystal panel 111, there is applied a transparent adhesive agent 110 comprising an amorphous fluorine resin having a refractive index in the range from 1.3 to 1.4. Thereafter the optical diffusion lens 108 is placed on the transparent adhesive agent 110 for subsequent heat treatment under pressure thereby the transparent adhesive agent 110 fits with the uneven second surface with the convex and concave portions of the optical diffusion lens 108 without any formation of space there between. If the difference in level of the convex or concave portion from the flat portions of the second surface of the optical diffusion lens 108 is relatively large, it may be available to apply the transparent adhesive agent onto not only the color filter substrate 105 but also the second surface with alternating the concave or convex portions and the flat portions of the optical diffusion lens 108 to facilitate the fitness between the color filter substrate 105 and the optical diffusion lens 108 without any space.

Figure 7A:
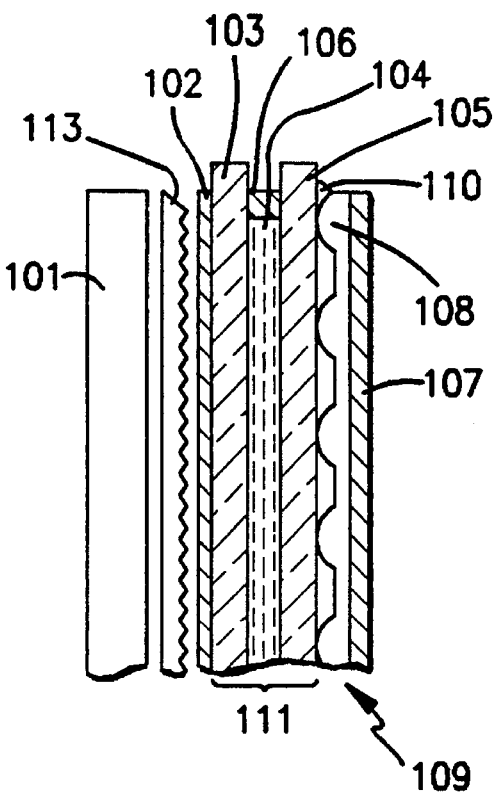
FIG. 7A is a fragmentary cross sectional elevation view illustrative of a novel transmission liquid crystal display in a second embodiment according to the present invention.

A second embodiment according to the present invention will be described with reference to FIG. 7A which is illustrative of a structure of another novel transmission liquid crystal display. A structural difference of the novel transmission liquid crystal display of the second embodiment from that of the first embodiment is only a further provision of a prism lens film between a surface light source and a liquid crystal panel. The novel transmission liquid crystal display comprises a surface light source 101, a liquid crystal panel 111 with a first side which faces to the surface light source 101 and an optical control plate 109 adhered on the liquid crystal panel at a second side thereof. The liquid crystal panel 111 comprises an active matrix substrate 103 and a color filter substrate 105 which are spaced apart from each other through a spacer 106 which comprises a sealing resin agent. A space defined between the active matrix substrate 103 and the color filter substrate 105 is filled with a liquid crystal 104 such as a twisted nematic liquid crystal. An outside surface of the active matrix substrate 103 is formed with a first polarizing plate 102 which faces to and is spaced part from the surface light source 101. The optical control plate 109 is adhered on an outside of the color filter substrate 105 by a transparent adhesive agent 110.

The optical control panel 109 comprises an optical diffusion lens 108 and a second polarizing plate 107. The optical diffusion lens 108 has a plate-like shape. The optical diffusion lens 108 has a first surface in contact with the second polarizing plate 107 and a second surface adhered through the transparent adhesive agent 110 on the outside surface of the color filter substrate 105. Entire parts of the first surface, in contact with the second polarizing plate 107, of the optical diffusion lens 108 are flat.

The second surface of the optical diffusion lens 108 comprises alternating flat portions "Y" and concave or convex portions "X" having a predetermined curvature. The concave or convex portions formed on the second surface of the optical diffusion lens 108 have a difference in level of a bottom or a top thereof from the flat portions of the optical diffusion lens 108. The concave or convex portions are arranged at a predetermined pitch so that a ratio of the difference in level to the pitch is in the range from 2.9:10 to 0.8:10 and more preferably from 1.8:10 to 1.2:10. The pitch is concretely in the range from 30 to 360 micrometers. This pitch should be determined to suppress any generation of moire on a screen image not illustrated but determined independently from a pitch between pixels of the display. The concave or convex portions of the optical diffusion lens have a semi-cylindrical shape with a ridge directed toward a horizontal direction of the display screen for compensation for a diffusion property having a large dependency upon a visual angle in a vertical direction. The diffusion property of the diffusion lens 108 has a larger dependency upon a visual angle in the vertical direction rather than a dependency upon a visual angle in the horizontal direction.

The flat portions are preferably processed to have mirror planes to reduce a scattering of light at the surface of the optical diffusion lens 108 as well as to prevent an unnecessary refraction of the light, although the concave or convex portions are preferably processed to have the mirror face. Such processes optical diffusion lens is capable of suppressing any display blur. The flat portions of the optical diffusion lens reduces the diffusion of the light. An increase in curvature of the concave portions can enhance the diffusion of the light. Accordingly, the decrement of the optical diffusion by the flat portions of the optical diffusion lens 108 can be compensated by the increase in the curvature of the concave portions thereof. Hence, the optical diffusion property of the optical diffusion lens 108 depends upon both a ratio in width of the concave or convex portions "X" to the flat portions "Y" and the curvature of the concave or convex portions "X".

As described above, in this embodiment, a further provision is made of a prism lens film 113 between the surface light source 101 and the first deflecting plate 102 of the liquid crystal panel 111. The prism lens film has a first flat surface facing to the surface light source 101 and a second surface, on which a number of triangle-shaped prisms are continuously placed at a pitch in the range from 30 to 360 micrometers, which faces to the liquid crystal panel 111. It may be said that the prism lens film 113 is a prism lens array film. The prism lens film 113 may be made of, for example, polycarbonate or an acrylic resin. Each of the prisms extends in a horizontal direction of the display screen for compensation of a larger dependency of the display quality upon a vertical direction visual angle rather than a horizontal direction visual angle. The prism lens film 113 shows a function of an optical collection in vertical direction of the diffused light emitted from the surface light source 101. Each of the prisms provided on the prism lens film 113 may, thus, have preferably a top angle o 90 degrees suitable for optical collection direction.

Figure 7B:
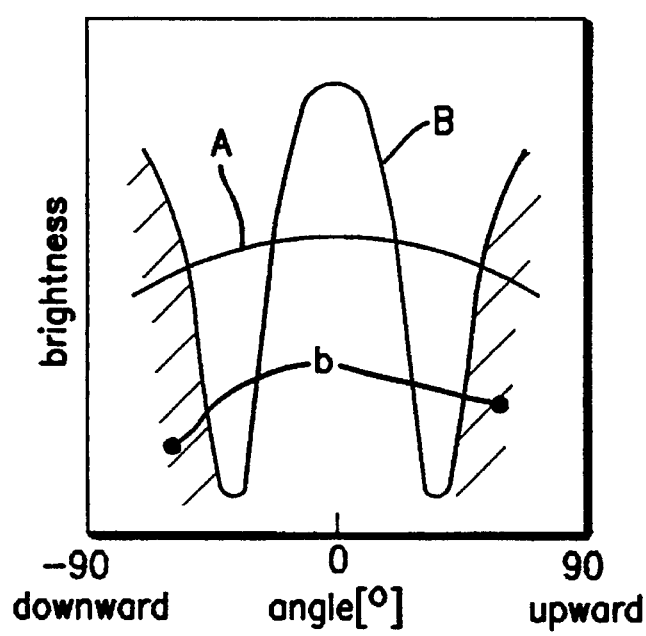
FIG. 7B is a diagram illustrative of a profile of brightness on a display screen versus a visual angle in a novel transmission liquid crystal display in a second embodiment according to the present invention.

Advantages due to the provision of the prism lens film 113 will be described with reference to FIG. 7B wherein a line "A" represents a distribution or profile of the brightness of the light emitted from the surface light source 101 versus the visual angle in the vertical direction of the display screen. The property of the above brightness depends loosely upon the directivity but strongly dependent upon the vertical visual angle. If the light emitted from the surface light source 101 were incident into the liquid crystal panel 111, then a large difference in retardation of the lights is generated thereby resulting in a narrow visual angle. According to this embodiment, the provision of the prism lens film 113, through which the light emitted from the surface light source 101 passes before incidence into the liquid crystal panel 111, allows any oblique components of the light to show a refraction by a refractive effect due to the prisms thereby the refracted light is directed along the normal line of the liquid crystal panel. As a result, the light having passed through the prism lens film 113 has a brightness property strongly dependent upon directivity as represented by a line "B". The directive light passes through the liquid crystal and then incident into the optical diffusion lens 108 where the light is subjected to the optical refraction and the diffusion wherein the light has a superior graduation or gray scale and a majority of the front component, resulting in a widely visible angle display being therefore obtained.

Figure 8:
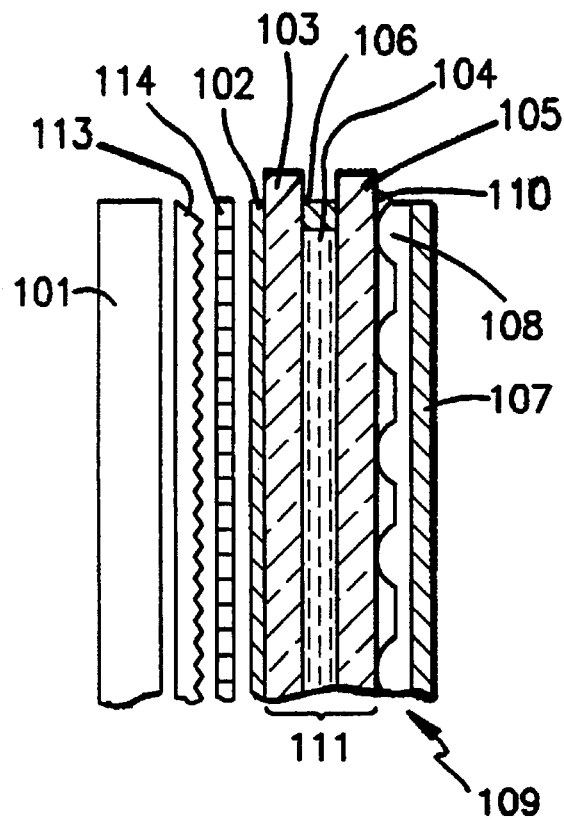
FIG. 8 is a fragmentary cross sectional elevation view illustrative of a novel transmission liquid crystal display in a third embodiment according to the present invention.

A third embodiment according to the present invention will be described with reference to FIG. 8 which is illustrative of a structure of another novel transmission liquid crystal display. A structural difference of the novel transmission liquid crystal display of the third embodiment from that of the second embodiment is only a furthermore provision of a louver between the prism lens film and the liquid crystal panel. The novel transmission liquid crystal display comprises a surface light source 101, a prism lens 113, a liquid crystal panel 111 with a first side which faces to the surface light source 101 and an optical control plate 109 adhered on the liquid crystal panel at a second side thereof. A space defined between the active matrix substrate 103 and the color filter substrate 105 is filled with a liquid crystal 104 such as a twisted nematic liquid crystal. An outside surface of the active matrix substrate 103 is formed with a first polarizing plate 102 which faces to and is spaced part from the surface light source 101. The optical control plate 109 is adhered on an outside of the color filter substrate 105 by a transparent adhesive agent 110.

The optical control panel 109 comprises an optical diffusion lens 108 and a second polarizing plate 107. The optical diffusion lens 108 has a plate-like shape. The optical diffusion lens 108 has a first surface in contact with the second polarizing plate 107 and a second surface adhered through the transparent adhesive agent 110 on the outside surface of the color filter substrate 105. Entire parts of the first surface, in contact with the second polarizing plate 107, of the optical diffusion lens 108 are flat.

The second surface of the optical diffusion lens 108 comprises alternating flat portions "Y" and concave or convex portions "X" having a predetermined curvature. The concave or convex portions formed on the second surface of the optical diffusion lens 108 have a difference in level of a bottom or a top thereof from the flat portions of the optical diffusion lens 108. The concave or convex portions are arranged at a predetermined pitch so that a ratio of the difference in level to the pitch is in the range from 2.9:10 to 0.8:10 and more preferably from 1.8:10 to 1.2:10. The pitch is concretely in the range from 30 to 360 micrometers. This pitch should be determined to suppress any generation of moire on a screen image not illustrated but determined independently from a pitch between pixels of the display. The concave or convex portions of the optical diffusion lens have a semi-cylindrical shape with a ridge directed toward a horizontal direction of the display screen for compensation for a diffusion property having a large dependency upon a visual angle in a vertical direction. The diffusion property of the diffusion lens 108 has a larger dependency upon a visual angle in the vertical direction rather than a dependency upon a visual angle in the horizontal direction.

The flat portions are preferably processed to have mirror planes to reduce a scattering of light at the surface of the optical diffusion lens 108 as well as to prevent an unnecessary refraction of the light, although the concave or convex portions are preferably processed to have the mirror face.

As described above, according to this embodiment, there is a furthermore provided a louver 114 between the prism lens 113 and the liquid crystal panel 111. The lover 114 may comprise a thin plastic plate incorporated with opaque black fine louvers extending along a horizontal direction for improvement in the vertical directivity of the light.

The louver 114 shows a function to cut off an optical component has a transmission direction which both is vertical to the louver's direction or the horizontal direction and is oblique from the normal line of the liquid crystal panel.

With reference back to FIG. 7B, a cross hatched portion "b" represents total reflecting lights. When a light is incident into the prism at a larger oblique angle than a critical angle, the light shows a total refraction and then a transmission direction of the light is largely off from the incident direction thereof.

The provision of the louver 114 may cut off the total reflection light namely may prevent the totally refracted light from being incident into the liquid crystal display panel 111 to thereby ensure a excellent directivity of the incident light into the liquid crystal panel 111. As a result, only the front component light with an excellent graduation property or gray scale property is incident into the optical diffusion lens 108 where the light is diffused. As a result, no inversion of the gray scale or graduation appears at all. A visual angle for obtaining a contrast ratio of 10 may be widen to extend 70 degrees or more each upward and downward, resulting in there being obtained a wide visible image independent from the visual angle.

Whereas modifications of the present invention will no doubt be apparent to a person having ordinary skill in the art, to which the invention pertains, it is to be understood that embodiments shown and described by way of illustrations are by no means intended to be considered in a limiting sense. Accordingly, it is to be intended to cover by claims all modifications which fall within the spirit and scope of the present invention.

What is claimed is:

1. An optical diffusion lens having a plate-like shape to be employed in a transmission liquid crystal display, said lens having first and second surfaces, said first surface facing to a display screen and said second surface facing to a liquid crystal panel, entire parts of said first surface are flat, and said second surface comprises alternating flat portions and semi-cylindrically shaped convex portions having a predetermined curvature, said convex portions having a difference in level of a top portion thereof from said flat portions, said convex portions being arranged at a predetermined pitch, wherein a ratio of said difference in level to said pitch is in the range from 2.9:10 to 0.8:10.

2. The lens as claimed in claim 1, wherein said first surface is covered by a polarization plate.

3. The lens as claimed in claim 1, wherein said second surface is fixed on said liquid crystal panel by a transparent adhesive agent.

4. The lens as claimed in claim 1, wherein said ratio is in the range from 1.8:10 to 1.2:10.

5. An optical diffusion lens having a plate-like shape to be employed in a transmission liquid crystal display, said lens having first and second surfaces, said first surface facing to a display screen and said second surface facing to a liquid crystal panel, entire parts of said first surface are flat, and said second surface comprises alternating flat portions and concave portions having a predetermined curvature, said concave portions having a difference in level of a bottom portion thereof from said flat portions, said concave portions being arranged at a predetermined pitch, wherein a ratio of said difference in level to said pitch is in the range from 2.9:10 to 0.8:10.

6. The lens as claimed in claim 5, wherein said concave portion has a semi-cylindrical shape.

7. The lens as claimed in claim 5, wherein said first surface is covered by a polarizing plate.

8. The lens as claimed in claim 5, wherein said second surface is fixed on said liquid crystal panel by a transparent adhesive agent.

9. The lens as claimed in claim 5, wherein said ratio is in the range from 1.8:10 to 1.2:10.

10. A transmission liquid crystal display comprising:
   a liquid crystal panel including at least two substrates spaced apart from one another through spacers to confine a liquid crystal between said two substrates;
   a surface light source provided at a first side of said liquid crystal panel; and
   an optical diffusion lens having a plate-like shape provided at a second side of said liquid crystal panel, said lens having first and second surfaces, said first surface facing to a display screen and said second surface facing to a liquid crystal panel, entire parts of said first surface are flat, and said second surface comprises alternating flat portions and semi-cylindrically shaped convex portions having a predetermined curvature, said convex portions having a difference in level of a top portion thereof from said flat portions, said convex portions being arranged at a predetermined pitch, wherein a ratio of said difference in level to said pitch is in the range from 2.9:10 to 0.8:10.

11. The display as claimed in claim 10, wherein said second surface is fixed on said liquid crystal panel by a transparent adhesive agent.

12. The display as claimed in claim 10, wherein said ratio is in the range from 1.8:10 to 1.2:10.

13. The display as claimed in claim 10, wherein said two substrates comprise:
   an active matrix substrate provided at said first side of said liquid crystal panel, said active matrix substrate being provided with a plurality of transparent pixel electrodes in matrix thereon; and
   a color filter substrate provided at said second side of said liquid crystal panel, said color filter substrate being formed with a color filter and a common electrode thereon.

14. A transmission liquid crystal display comprising:
   a liquid crystal panel including at least two substrates spaced apart from one another through spacers to confine a liquid crystal between said two substrates;
   a surface light source provided at a first side of said liquid crystal panel; and
   an optical diffusion lens having a plate-like shape provided at a second side of said liquid crystal panel, said lens having first and second surfaces, said first surface facing to a display screen and said second surface facing to a liquid crystal panel, entire parts of said first surface are flat, and said second surface comprises alternating flat portions and concave portions having a predetermined curvature, said concave portions having a difference in level of a bottom portion thereof from said flat portions, said concave portions being arranged at a predetermined pitch, wherein a ratio of said difference in level to said pitch is in the range from 2.9:10 to 0.8:10.

15. The display as claimed in claim 14, wherein said concave portion has a semi-cylindrical shape.

16. The display as claimed in claim 14, wherein said second surface is fixed on said liquid crystal panel by a transparent adhesive agent.

17. The display as claimed in claim 14, wherein said ratio is in the range from 1.8:10 to 1.2:10.

18. The display as claimed in claim 14, further comprising a first polarizing plate provided on said first surface of said optical diffusion lens.

19. The display as claimed in claim 18, further comprising a second polarizing plate provided at said first side on said liquid crystal panel.

20. The display as claimed in claim 19, wherein said second deflection plate has a polarizing axis different by 90 degrees from a polarizing axis of said first deflection plate.

21. The display as claimed in claim 19, further comprising a prism lens film provided between said surface light source and said liquid crystal panel.

22. The display as claimed in claim 21, further comprising a louver provided between said prism lens and said liquid crystal panel.

23. The display as claimed in claim 14, wherein said two substrates comprise:
   an active matrix substrate provided at said first side of said liquid crystal panel, said active matrix substrate being provided with a plurality of transparent pixel electrodes in matrix thereon; and
   a color filter substrate provided at said second side of said liquid crystal panel, said color filter substrate being formed with a color filter and a common electrode thereon.

24. A transmission liquid crystal display comprising:
   a liquid crystal panel including at least two substrates spaced apart from one another through spacers to confine a liquid crystal between said two substrates;
   a surface light source provided at a first side of said liquid crystal panel;
   a prism lens film provided between said surface light source and said liquid crystal panel;
   a louver provided between said prism lens film and said liquid crystal panel; and
   an optical diffusion lens having a plate-like shape provided at a second side of liquid crystal panel, said lens having first and second surfaces, said first surface facing to a display screen and said second surface facing to a liquid crystal panel, said optical diffusion lens comprising a first polarizing plate provided on said first surface, a second polarizing plate being provided at said first side on said liquid crystal panel, entire parts of said first surface being flat, said second surface comprising alternating flat portions and semi-cylindrically shaped convex portions having a predetermined curvature, said convex portions having a difference in level of a top portion thereof from said flat portions, said convex portions being arranged at a predetermined pitch, wherein a ratio of said difference in level to said pitch is in the range from 2.9:10 to 0.8:10.

* * * * *